(12) United States Patent
Hagemann (10) Patent No.: US 11,572,730 B2
(45) Date of Patent: Feb. 7, 2023

(54) SPINDLE DRIVE, SPINDLE NUT, AND LOUVRE WINDOW OR LOUVRE SHUTTER HAVING A SPINDLE DRIVE

(71) Applicant: D+H MECHATRONIC AG, Ammersbek (DE)

(72) Inventor: Ralf Hagemann, Rosengarten (DE)

(73) Assignee: D+H MECHATRONIC AG

( * ) Notice: Subject to any disclaimer, the term of this patent is extended or adjusted under 35 U.S.C. 154(b) by 104 days.

(21) Appl. No.: 17/266,731

(22) PCT Filed: Aug. 7, 2019

(86) PCT No.: PCT/EP2019/071188
§ 371 (c)(1),
(2) Date: Jul. 28, 2021

(87) PCT Pub. No.: WO2020/030680
PCT Pub. Date: Feb. 13, 2020

(65) Prior Publication Data
US 2021/0355735 A1 Nov. 18, 2021

(30) Foreign Application Priority Data

Aug. 8, 2018 (DE) .......................... 202018104555.5

(51) Int. Cl.
*E05F 15/622* (2015.01)
*E06B 3/50* (2006.01)
(Continued)

(52) U.S. Cl.
CPC .......... *E05F 15/622* (2015.01); *E06B 3/5036* (2013.01); *F16H 25/24* (2013.01);
(Continued)

(58) Field of Classification Search
CPC ............. F16H 25/24; F16H 2025/2062; F16H 2025/2445; E05F 15/622; E06B 3/5036
See application file for complete search history.

(56) References Cited

U.S. PATENT DOCUMENTS 5,797,293 A * 8/1998 Chaban ................... F16H 25/24
74/89.36
5,816,555 A 10/1998 Ito et al.
(Continued)

FOREIGN PATENT DOCUMENTS

| DE | 9002766 | 7/1991 |
| EP | 0552464 | 7/1993 |
| EP | 3199742 | 8/2017 |

*Primary Examiner* — David M Fenstermacher
(74) *Attorney, Agent, or Firm* — Sand, Sebolt & Wernow Co., LPA (57) ABSTRACT

A spindle drive, a spindle nut for the spindle drive, and a louvre window or louvre shutter having a spindle drive for moving louvre elements. The spindle nut is constructed in multiple parts including a screw nut part, having an internal thread to engage on an external thread of the threaded spindle, and a bearing part in which the screw nut part is mounted. The screw nut part includes a driver structure for transmitting a drive force applied by the threaded spindle to the spindle nut onto an element to be driven. Furthermore, the screw nut part is rotatably mounted in the bearing part in such a way that the screw nut part executes a relative movement in relation to the bearing part, and a directional component of the movement is transverse to a thread longitudinal axis of the internal thread.

14 Claims, 4 Drawing Sheets

(51) Int. Cl.
*F16H 25/24* (2006.01)
*F16H 25/20* (2006.01)

(52) U.S. Cl.
CPC ............... *F16H 2025/2062* (2013.01); *F16H 2025/2445* (2013.01)

(56) References Cited

U.S. PATENT DOCUMENTS

| | | | | |
|---|---|---|---|---|
| 5,860,319 | A * | 1/1999 | Via | B60N 2/0232 74/89.36 |
| 6,026,697 | A * | 2/2000 | Krbec | F16H 25/24 74/89.36 |
| 11,371,269 | B2 * | 6/2022 | Pettengill | E05B 83/18 |
| 2018/0223583 | A1 * | 8/2018 | Podkopayev | F16H 25/20 |
| 2019/0016364 | A1 * | 1/2019 | Palmer | B62D 1/181 |
| 2019/0316661 | A1 * | 10/2019 | Parker | F16H 25/24 |
| 2021/0355735 | A1 * | 11/2021 | Hagemann | E05F 15/622 |
| 2022/0178428 | A1 * | 6/2022 | Lee | F16H 25/2223 |

* cited by examiner

SPINDLE DRIVE, SPINDLE NUT, AND LOUVRE WINDOW OR LOUVRE SHUTTER HAVING A SPINDLE DRIVE

TECHNICAL FIELD

The invention relates to a spindle drive, in particular for the motor-driven movement of louvre elements of louvre windows or louvre shutters, wherein the spindle drive includes a threaded spindle drivable to rotate by a drive motor, and a spindle nut engaged with the threaded spindle and displaceable axially along the threaded spindle by rotation of the threaded spindle. It additionally relates to a spindle nut for such a spindle drive and a louvre window or a louvre shutter having a spindle drive for moving louvre elements.

BACKGROUND

Background Information

Spindle drives are known in greatly differing applications. They are generally used to convert a rotational drive movement into a linear movement. In addition to manual spindle drives, motor-driven spindle drives are also used in particular, wherein such motor-driven spindle drives are the subject matter of the present application.

An application of such spindle drives which is particularly in focus for the applicant is the movement of closure elements for windows and/or shutters, in particular of louvre elements of louvre windows or louvre shutters. For such components, for example louvre windows used in façades, which have two or more window louvres arranged pivotably in a frame around respective rotational axes extending in parallel to one another, spindle drives are generally used to displace a thrust element driven by a motor, which thrust element is part of a gearing, to which the window louvres are coupled, in order to correspondingly pivot them in a synchronized manner to open or close the window opening.

In particular also because corresponding louvre windows are being constructed having larger and larger dimensions and thus the window louvres are also constructed having larger areas and thus having higher intrinsic weight and at the same time offer more engagement area for loading wind loads, the forces and torques to be applied by the spindle drives have become greater than earlier requirements. This results in problems in particular if the spindle drive, which has a drive motor, a threaded spindle coupled to the drive motor for a rotating drive, and a spindle nut seated on the threaded spindle and displaceable thereon by rotational movement of the threaded spindle in the longitudinal direction of the threaded spindle, is not manufactured exactly and with ultra-narrow tolerances at the highest level. Even small tolerance deviations result in running which is no longer exact, so that during the drive of the threaded spindle, the spindle nut guided thereon can experience transverse forces pointing transversely in relation to the spindle longitudinal axis. These transverse forces have the result that, in particular at higher drive torques, the spindle nut tilts, so that an uneven load distribution occurs on the thread flanks and the thread of the spindle nut and the threaded spindle tend to jam or wedge. Additional drive force then has to be applied in order to overcome these jamming forces and move the spindle nut in the longitudinal direction of the threaded spindle. The efficiency of the spindle drive thus decreases, spindle drives possibly have to be designed having higher power than would possibly be required without calculating in such an efficiency loss, and increased wear of the participating components results, in particular of the spindle nut and the threaded spindle, which reduces the service life of the spindle drive as a whole.

However, the above-described problem does not exist only in relationship with spindle drives for louvre elements of louvre windows or louvre shutters, but rather always in general where spindle drives have to move particularly high loads and transverse forces which are applied to the spindle nut cannot be precluded in the construction of the spindle drive.

SUMMARY

The object of the invention is to address the problem described above and refine a spindle drive in such a way that in spite of possibly occurring transverse forces on the spindle nut these do not result in increased thread resistance, and wedging or jamming of the spindle nut on the threaded spindle. In particular, an improved spindle drive which achieves this object is to be specified. Further considerations of the invention are also directed to improving a spindle nut for such a spindle drive and an improved louvre window or an improved louvre shutter having a correspondingly improved spindle drive.

The object stated above is achieved according to the invention by a spindle drive wherein the spindle nut may be constructed in multiple parts, in particular two parts, having a screw nut part which may include an internal thread to engage on an external thread of the threaded spindle, and a bearing part in which the screw nut part may be mounted and which may include a driver structure for transmitting a drive force applied by the threaded spindle to the spindle nut to an element to be driven, wherein the screw nut part may be mounted in the bearing part in such a way that it can execute a relative movement in relation to the bearing part having a directional component of the movement transverse to a thread longitudinal axis of the internal thread.

Advantageous refinements and embodiments of such a spindle drive include that the screw nut part may have a bearing surface formed on an outer side of the screw nut part, which may be formed in the shape of a spherical or cylindrical section in at least one section, wherein the screw nut part may be mounted in a receptacle formed in the bearing part, wherein the receptacle may have a receptacle surface, which may be formed in at least one section in the shape of a spherical or cylindrical section corresponding to the section formed in the shape of a spherical or cylindrical section of the bearing surface, so that the respective sections formed in the shape of spherical or cylindrical sections of bearing surface and receptacle surface may form a joint. Additionally, the section of the bearing surface formed in the shape of a spherical or cylindrical section may be formed on at least one axial end face of the screw nut part viewed in a thread longitudinal direction in a region which may be located axially beyond the internal thread, in front of or behind the internal thread, in the direction of the thread longitudinal axis. Still further, the spindle drive may include axial stops arranged in the bearing part for the screw nut part. The spindle drive may further include a twist lock for preventing a relative twist of the screw nut part in relation to the bearing part around the thread longitudinal axis of the internal thread. Additionally, the spindle drive may include a common drive housing, in which the drive motor, the threaded spindle, and the spindle nut may be arranged. Still further, the drive housing may have a shape elongated in a longitudinal direction, wherein the threaded spindle may be arranged extending in the longitudinal direction of the drive housing. The spindle drive may further include guide structures formed in the drive housing, in particular guide faces, which may interact with corresponding counter structures on the bearing part of the spindle nut in order to guide the spindle nut in the longitudinal direction of the drive housing.

An improved spindle nut according to the invention may be constructed in multiple parts, in particular two parts, having a screw nut part which may include an internal thread to engage on an external thread of the threaded spindle and a bearing part, in which the screw nut part may be mounted and which may include a driver structure for transmitting a drive force applied to the spindle nut to an element to be driven, wherein the screw nut part may be mounted in the bearing part in such a way that it can execute a relative movement in relation to the bearing part having a directional component of the movement transverse to a thread longitudinal axis of the internal thread.

Possible embodiment variants of this spindle nut may include that the screw nut part has a bearing surface formed on an outer side of the screw nut part, which may be formed in the shape of a spherical or cylindrical section in at least one section, wherein the screw nut part may be mounted in a receptacle formed in the bearing part, wherein the receptacle may have a receptacle surface, which may be formed in at least one section in the shape of a spherical or cylindrical section corresponding to the section formed in the shape of a spherical or cylindrical section of the bearing surface, so that the respective sections formed in the shape of spherical or cylindrical sections of bearing surface and receptacle surface may form a joint. The bearing surface formed in the shape of a spherical or cylindrical section may be formed on at least one axial end face of the screw nut part viewed in a thread longitudinal direction in a region which is located axially beyond the internal thread, in front of or behind the internal thread, in the direction of the thread longitudinal axis. The spindle nut may include axial stops arranged in the bearing part for the screw nut part. Furthermore, the spindle nut may include a twist lock for preventing a relative twist of the screw nut part in relation to the bearing part around the thread longitudinal axis of the internal thread.

An improved louvre window according to the invention or such a louvre shutter may include a louvre window or louvre shutter having louvre elements arranged in a common frame pivotably around parallel rotational axes and a drive gearing which may include a thrust element connected to the louvre elements to convert a longitudinal movement into rotational movements of the louvre elements around the rotational axes, and the louvre window or the louvre shutter may include a spindle drive as discussed above which may be coupled to the thrust element to drive the thrust element.

A spindle drive according to the invention, which is or can be conceived in particular for motor-driven movements of louvre elements of louvre windows or louvre shutters, firstly has—and this corresponds to spindle drives known per se—a drive motor and a threaded spindle drivable to rotate thereby and also a spindle nut, which is engaged with the threaded spindle and is axially displaceable along the threaded spindle by rotation of the threaded spindle.

The special feature of the spindle drive according to the invention is the design of the spindle nut, which is constructed in multiple parts, in particular two parts, according to the invention and includes a screw nut part and a bearing part. The screw nut part has an internal thread for engaging on an external thread of the threaded spindle and thus interacts directly with the threaded spindle and its external thread. The bearing part receives the screw nut part; the screw nut part is mounted in the bearing part. Driver structures are provided on the bearing part, via which a drive force applied by the threaded spindle to the spindle nut can be transmitted to an element to be driven. Using such driver structures, which can have, for example the form of a groove or a notch, the form of a hole, the form of a retaining pin, or the like, an actual element to be linearly moved and driven by means of the spindle drive can be coupled to the bearing part of the spindle nut. It is furthermore essential that the screw nut part is not, for example secured rigidly and fixed in position in the bearing part, but rather these two parts are movable independently of one another and relative to one another in a degree of freedom, the screw nut part is thus mounted in the bearing part in such a way that it can execute a relative movement in relation to the bearing part having a directional component of the movement transverse to a thread longitudinal axis of the internal thread.

The screw nut part is mounted in the bearing part in particular in such a way that it transmits an axial movement along the threaded spindle to the bearing part essentially without play. Solely a compensation movement having a movement component in a transverse direction to the thread longitudinal axis can be executed between screw nut part and bearing part, so that transverse loads, transverse forces, or transverse torques applied to the bearing part are not transmitted to the screw nut part and thus cannot result in wedging or jamming of the internal thread of the screw nut part on the external thread of the threaded spindle, as described above. Rather, a certain yielding movement of the bearing part in relation to the screw nut part is induced by the transverse force, which is possible due to the mounting of these two parts movably in relation to one another, and such a transverse force is thus compensated for and absorbed.

Therefore, a spindle drive designed according to the invention no longer has to apply a high motor power in the event of applied transverse forces in order to overcome the clamping forces between internal thread of the screw nut part and external thread of the threaded spindle and move the spindle nut. Due to the lower friction losses to be achieved by the invention during the movement of the spindle nut, the power consumption of the spindle drive decreases, and the efficiency of the spindle drive is increased. Therefore, a spindle drive or drive motor which is designed smaller with respect to the power data can be used for a provided application if possible. Power supply units can also be used which transform the grid voltage down to a safety extra-low voltage of the motor. They can generally be integrated into the drive or installed outside the drive. They are smaller and permit an overall more cost-effective construction and design. The required power supply cables and electronic/electromechanical components and emergency power supply systems can also be dimensioned smaller and thus provided more cost-effectively. The wear, in particular of the internal thread of the spindle nut (of the screw nut part here) and the external thread of the threaded spindle is also reduced, and the service life and durability of the spindle drive thus constructed are increased.

The relative movement between bearing part and screw nut part can be obtained, as provided in one exemplary embodiment, in that the screw nut part has a bearing surface formed on an outer side of the screw nut part, which is formed in the shape of a spherical section or cylindrical section in at least one section. Furthermore, in this embodiment variant, the screw nut part is mounted in a receptacle formed in the bearing part and this receptacle has a receptacle surface, which is formed in at least one section in the shape of a spherical section or cylinder section, corresponding to the section of the bearing surface formed in the shape of a spherical section or cylinder section. The respective formation of the surfaces, bearing surface and receptacle surface, is conceived here so that the respective sections of bearing surface and receptacle surface formed in the shape of a spherical section or cylinder section form a joint. In this way, a relative movement and yielding movement essentially following a rotation can take place between bearing part and screw nut part when transverse loads occur.

In the above-described embodiment variant, it can be provided in particular that the section of the bearing surface formed in the shape of a spherical section or cylinder section is formed on at least one axial end face of the screw nut part viewed in the thread longitudinal direction, in a region which is located in front of or behind the internal thread in the direction of the thread longitudinal direction axially beyond the internal thread. In this way, loads of the screw nut part are introduced onto the bearing part (via the corresponding section of the receptacle surface, which then also has an end-face location) completely as pressure loads and not as tension loads. This results in improved strength in relation to the case in which these loads would be transmitted entirely or also only partially as tension loads. In particular in the case of impact stresses, this has advantages and is also expressed, for example in improved break-in protection upon use of the spindle drive in a louvre window or a louvre shutter, since the louvres connected to the drive cannot be pried out as easily. Furthermore, the structural space which is required for the load transmission from the screw nut part to the bearing part is located in the direction of the thread longitudinal axis, i.e., typically in a longitudinal direction of the spindle drive or its housing, which permits a narrow embodiment of the spindle drive. This has advantages in particular for the use of the spindle drive in a concealed installation. In particular, a respective section formed in the shape of a spherical section or cylinder section can be formed at both end faces of the screw nut part opposite to one another along the thread longitudinal axis for the load transmission outside the overlap of the internal thread (in front of and behind this in the axial direction of the thread longitudinal axis), so that a pressure transfer of the loads to be applied can take place in both movement directions of the spindle nut.

In a further embodiment variant, it can advantageously be provided that axial stops for the screw nut part are provided in the bearing part. Such axial stops are used in particular for fixing the position of the screw nut part relative to the bearing part essentially without play in a direction parallel to the thread longitudinal axis of the screw nut part. The linear drive obtained by the interaction of threaded spindle and screw nut part is thus transferred directly and substantially without play to the bearing part and via the bearing part to an element to be moved by the spindle drive.

It is advantageously ensured using a twist lock that the screw nut part cannot be pivoted in relation to the bearing part around the thread longitudinal axis of the internal thread formed in the screw nut part. It is thus ensured that a rotation of the threaded spindle also reliably results in a longitudinal displacement of the spindle nut. Such a twist lock can be formed in greatly differing ways. In particular, it is achieved by a non-rotationally symmetric cross-sectional shape of the screw nut part in at least one plane of section extending perpendicularly to the thread longitudinal axis of the internal thread formed in the screw nut part and a corresponding counter form in the bearing part, wherein the twist lock is also designed so that it does not obstruct the desired compensation or yielding movement between the screw nut part and the bearing part (a movement which essentially follows a tilt or rotation around an axis extending transversely to the thread longitudinal axis). This can be achieved, for example, in a screw nut part otherwise formed in the shape of a cylindrical jacket in its longitudinal direction (i.e., the extension direction of the thread longitudinal axis) by at least one, in particular two projection(s) opposite to one another transversely to the thread longitudinal axis, which form a surface in the shape of a partial cylinder or spherical section and two end faces located in the circumferential direction of the screw nut part, in particular flatly formed stop faces, and which interact with corresponding counter structures formed, for example as a depression or depressions in the bearing part. These counter structures then in particular also have stops in turn, which interact with the stop faces in order to prevent a relative pivot of the screw nut part in relation to the bearing part around the thread longitudinal axis. The depressions are shaped rectangularly, for example, so that they offer sufficient play to permit the above-described yielding or compensation movement.

As known as such in comparable spindle drives, the spindle drive according to the invention can also include a common drive housing, in which the drive motor, the threaded spindle, and the spindle nut are arranged. The drive housing can advantageously have a shape elongated in a longitudinal direction, wherein the threaded spindle is then arranged extending in the longitudinal direction of the drive housing. Guide structures are particularly advantageously formed in the drive housing, in particular as guide surfaces which interact with corresponding counter structures on the bearing part of the spindle nut in order to guide the spindle nut in the longitudinal direction of the drive housing. Additional stability and improved functionality of the spindle drive according to the invention are obtained by such a guide.

A further aspect of the invention described here is the special design of the spindle nut as described as a whole above in conjunction with the structure of the spindle drive. The spindle nut is thus also to be viewed isolated as separate subject matter of the invention; the special possible embodiments of the spindle nut as described above in conjunction with the description of the spindle drive also represent special features of this aspect of the invention taken as such.

Finally, a further aspect of the invention can be seen in a louvre window or a louvre shutter which, in a routine manner, includes louvre elements pivotably arranged around parallel rotational axes in a shared frame and a drive gearing, which drive gearing includes a thrust element connected to the louvre elements to convert a longitudinal movement into rotational movements of the louvre elements around their rotational axes. The louvre window or the louvre shutter according to the invention is distinguished in that it includes a spindle drive of the above-described type, which is coupled to the thrust element to drive the thrust element.

BRIEF DESCRIPTION OF THE SEVERAL VIEWS OF THE DRAWINGS

Further advantages and features of the invention result from the following description of an exemplary embodiment on the basis of the appended figures. In the figures.

DETAILED DESCRIPTION

One possible exemplary embodiment of a spindle drive according to the invention is shown in the figures, which in particular includes a spindle nut according to the invention and can be used in the manner according to the invention in a louvre window or a louvre shutter for the drive of the movement of the louvre elements (window louvres or shutter louvres). The figures are not to be understood as complete design drawings and in particular are not to scale. Rather, they represent schematic sketches which, however, in the aspects which show the elements essential according to the invention, depict a more detailed illustration.

In the figures, a spindle drive according to the invention is identified in the embodiment variant shown therein with the reference sign 1. The spindle drive 1 has an elongated, tubular drive housing 2, which is rectangular in cross section and in which elements essential for the operation and the function of the spindle drive 1 are arranged. These essential elements are in essence a drive motor 3, a threaded spindle 4 connected to the drive motor 3 for the rotating drive thereof, possibly via an interconnected gearing, and a spindle nut 5 running guided using an internal thread formed therein on an external thread of the threaded spindle 4. In this general structure, the spindle drive 1 according to the invention corresponds to the fundamental structure of typical and known spindle drives as are used in many areas of application in order to convert a rotational drive generated by a motor into a linear movement.

Figure 3:
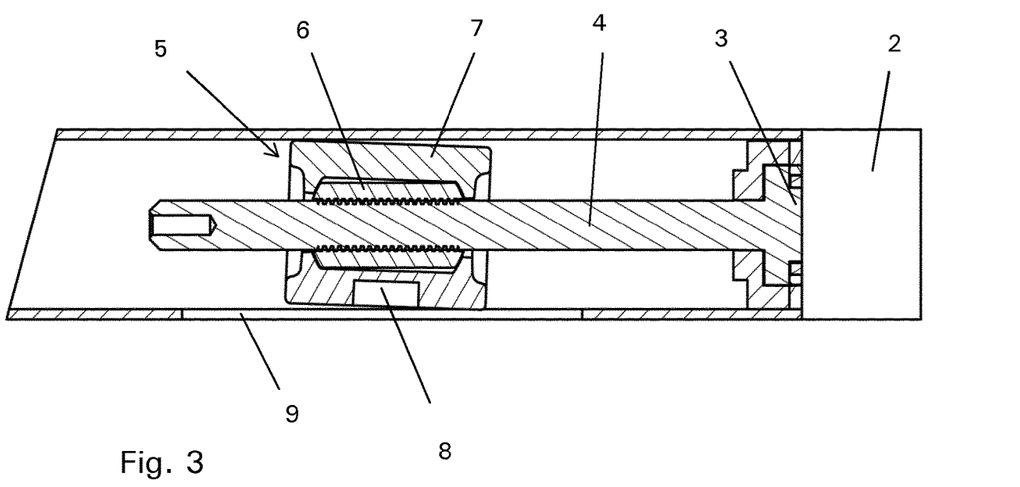
FIG. 3 shows an enlarged illustration of a detail from FIG. 2, from which the threaded spindle and the spindle nut seated thereon may be seen in greater detail.
Figure 4:
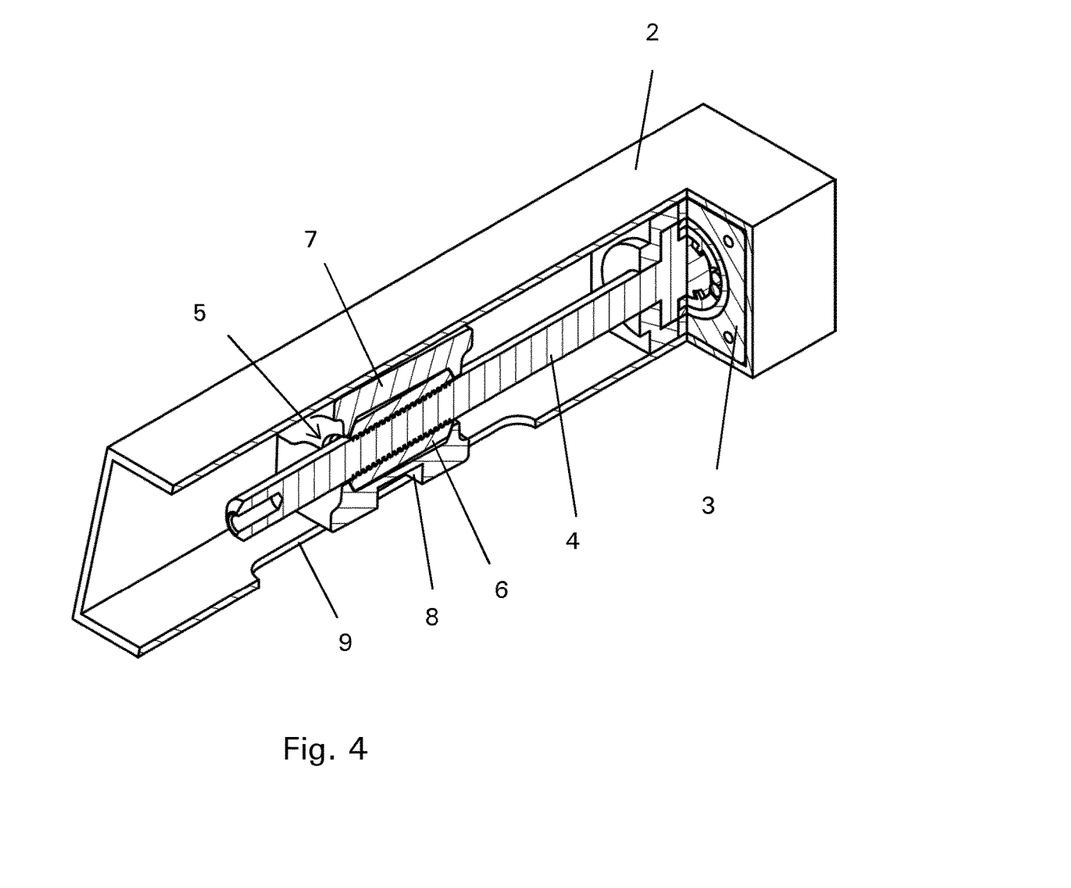
FIG. 4 shows a partially cutaway three-dimensional view of the section of the spindle drive shown in FIG. 3.

The special feature of the spindle drive 1 according to the invention is the design of the spindle nut 5. As may be seen in FIGS. 3 to 7, in particular as shown in the enlarged illustration according to FIGS. 5 to 7, this is constructed in two parts having a screw nut part 6 and a bearing part 7, in which the screw nut part 6 is mounted. The screw nut part 6 has the actual internal thread to interact with the external thread of the threaded spindle 4 (in each of FIGS. 3 to 5, only the section of the threaded spindle 4 on which the screw nut part 6 is seated is shown having the external thread, however the external thread additionally extends beyond this and over essentially the entire length of the threaded spindle 4).

Figure 1:
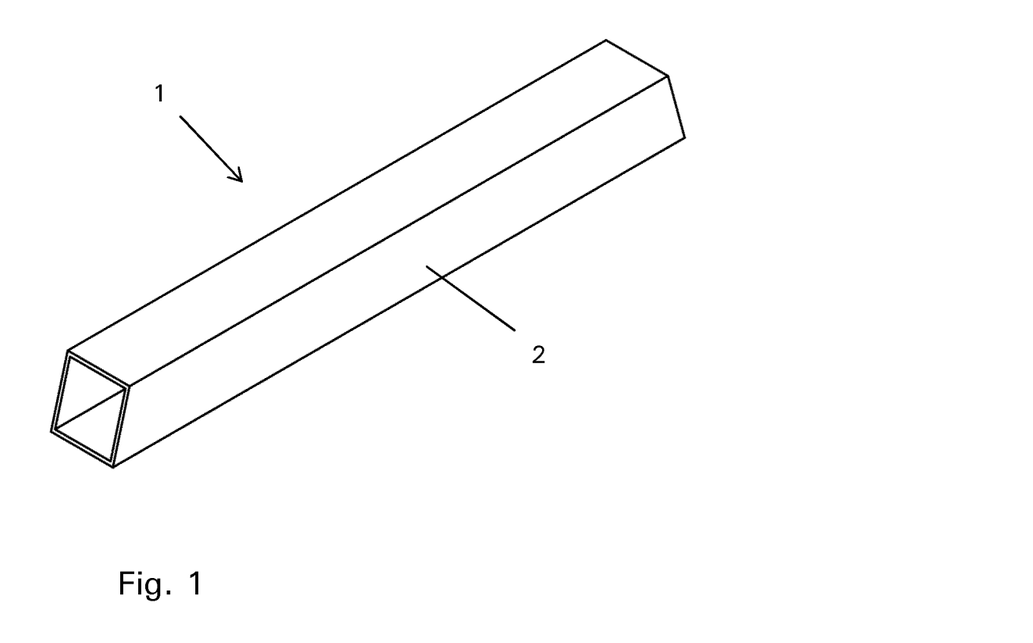
FIG. 1 shows a three-dimensional view of an exemplary embodiment of a spindle drive according to the invention.
Figure 2:
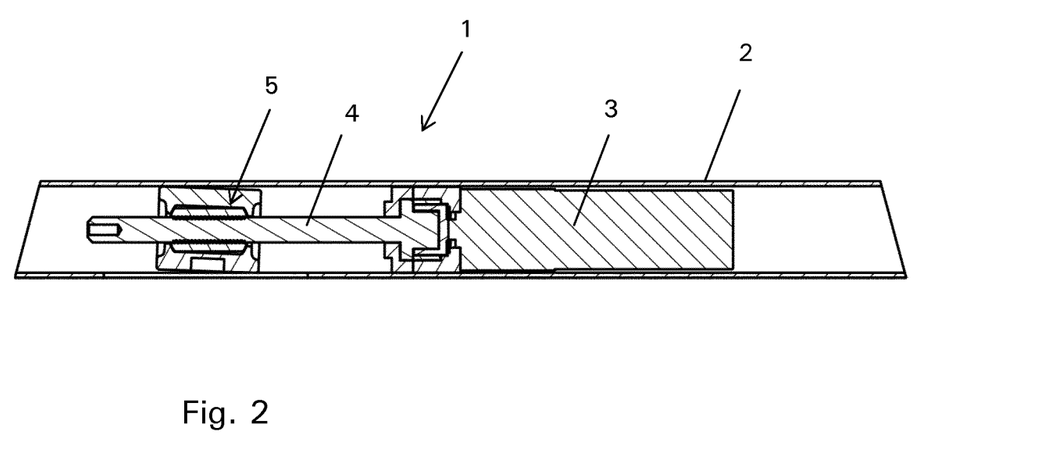
FIG. 2 shows a longitudinal sectional view of the spindle drive shown in FIG. 1.

The bearing part 7 has a connection option for connection to an element to be driven by the spindle nut 5 and to be linearly moved. This connection option is formed here by a notch 8 in the bearing part 7, in which a cam-like catch projection formed on an element to be moved can be inserted and can be held there in a formfitting manner for driving in a longitudinal direction. The bearing part 7 is formed here so that it has an external cross section approximately corresponding to the internal cross section of the drive housing 7, so that the bearing part 7 experiences a guide due to the drive housing 2. It is also recognizable in particular in FIGS. 2 to 4 that the drive housing 2 has a slot 9 extending in the longitudinal direction of the drive housing 2 in one section, through which the above-described connection of an element to be moved can be guided and fixed in the notch 8 in the bearing part 7. Driving of the element to be moved, which is thus connected to the bearing part 7 of the spindle nut 5, can then be carried out driven by the spindle drive 1 over the length of the slot 9.

Figure 5:
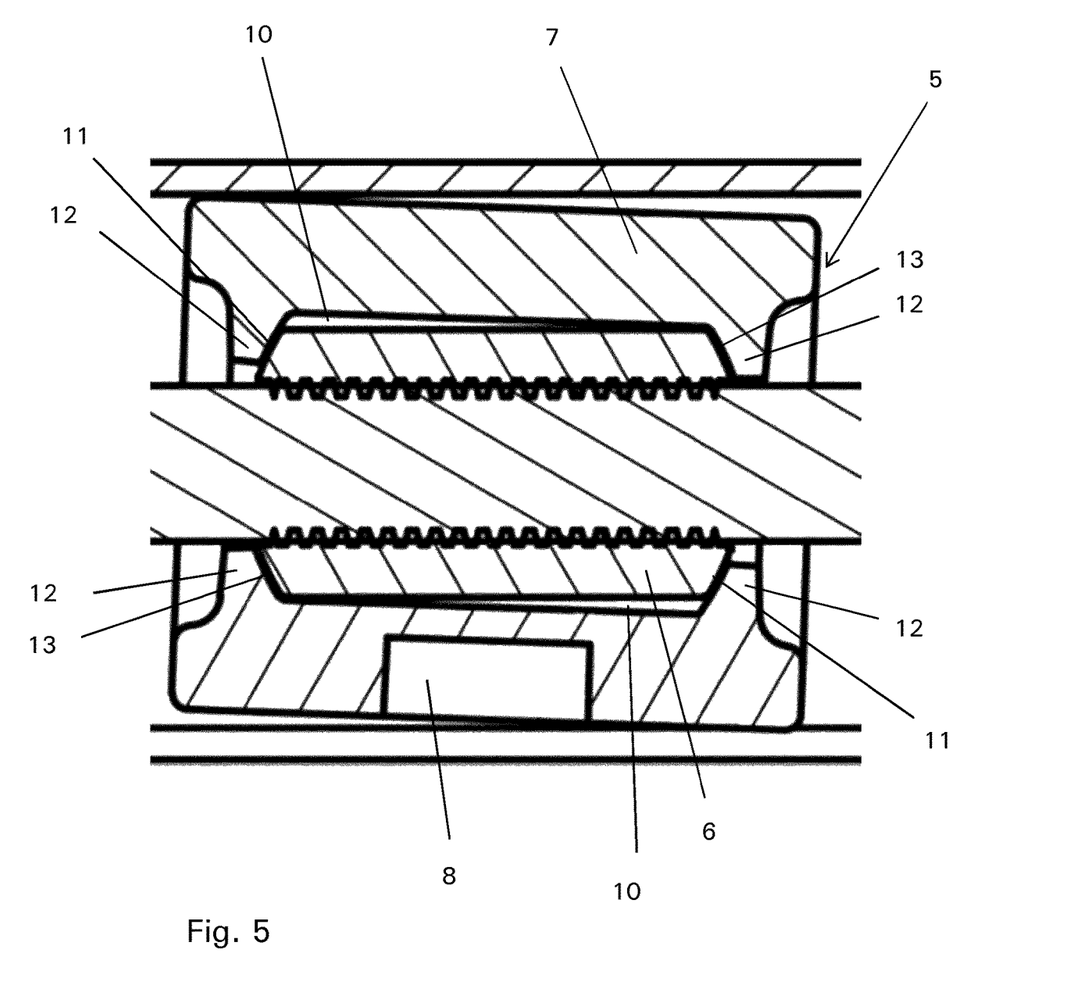
FIG. 5 shows an enlarged sectional illustration of the spindle nut seated on the threaded spindle.
Figure 6:
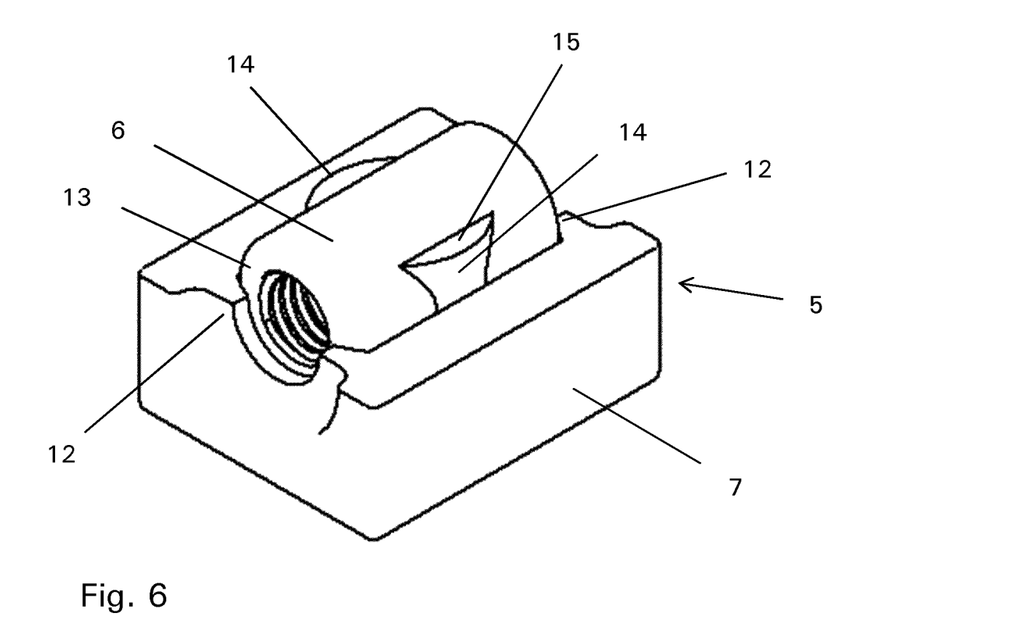
FIG. 6 shows a view of the spindle nut having partially cutaway bearing part to illustrate a twist lock.
Figure 7:
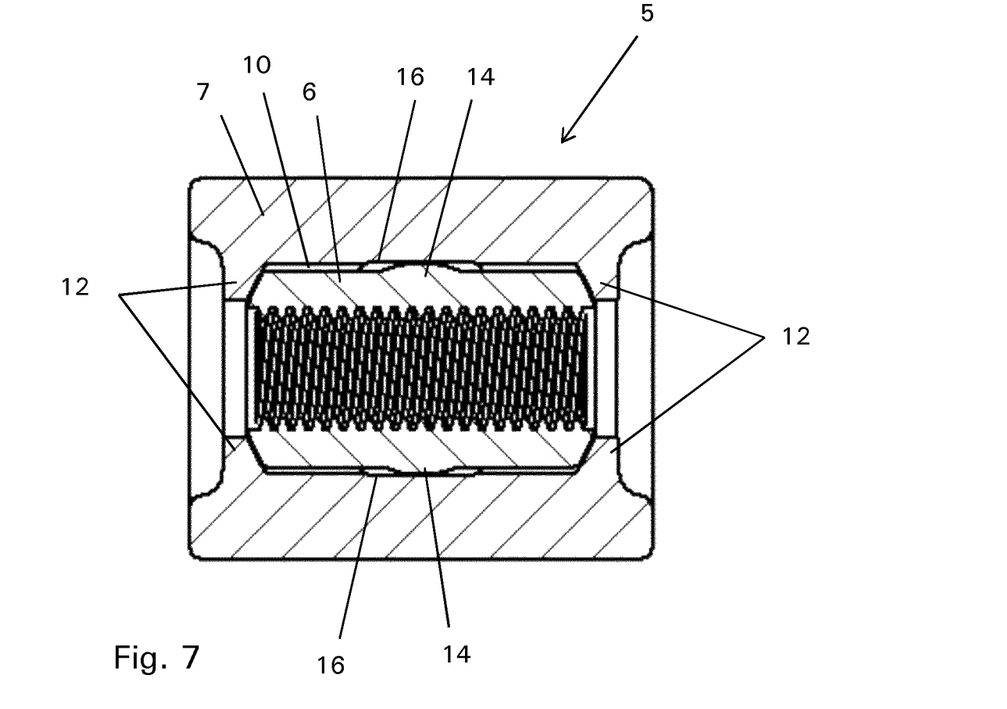
FIG. 7 shows a sectional illustration of the spindle nut along a plane of section located perpendicularly to the plane of section selected in the illustration of FIG. 5.

As may be recognized from FIG. 5 in particular, but may also be seen from FIGS. 6 and 7, a receptacle 10 is formed in the bearing part 7, in which the screw nut part 6 is received. This receptacle 10 in particular has front and rear guide faces 11, which are shaped on an inner side of a respective projection 12 facing toward the receptacle 10. The projections 12 extend here in a direction transverse to a longitudinal axis of the threaded spindle 4. The guide faces 11 are formed in the shape of a spherical section in this exemplary embodiment. However, they can also have a different shape, for example the shape of a cylindrical section, as long as the shape of these faces permits a movement option as described hereinafter. The screw nut part 6 received in the receptacle 10 presses with end faces 13 on the guide faces 11 of the receptacle 10, wherein the end faces 13 are formed in a corresponding shaping to the guide faces 11 formed on the inner sections of the projections 12 facing toward the receptacle, and in this exemplary embodiment are thus formed in the shape of spherical sections, but can also be formed in the shape of cylinder sections, for example, if the guide faces 11 have such a shape, or can also assume another shape corresponding to the guide faces 11. The guide faces 11 are formed on the screw nut part 6 in the direction of a thread longitudinal axis of its internal thread on a front and rear end face and in this axial direction are located in front of or behind the section of the screw nut part 6 in which the internal thread is formed. A transmission of loads from the screw nut part 6 to the bearing part 7 (via the end faces 13) can thus take place by pressure and not by traction in both axial movement directions of the spindle nut.

It can also be seen that the bearing part 7 having the screw nut part 6 received in the receptacle 10 has a certain play in a direction transverse to the longitudinal axis of the threaded spindle 4 or transverse to the thread longitudinal axis of the internal thread in the screw nut part 6. This play and the corresponding formation as described above of the corresponding guide faces 11 and end faces 13 formed accordingly in the shape of spherical (or cylindrical) sections or comparably as joint faces results in a formation of a joint, in the manner of a pivot joint, around which the elements screw nut part 6 and bearing part 7, which are not fixedly connected to one another, are movable relative to one another and can accordingly be moved, in particular tilted or pivoted around an axis transverse to the thread longitudinal axis, in a direction transverse to the thread longitudinal axis of the internal thread in the screw nut part 6. In FIG. 5, a corresponding tilt is shown in order to illustrate this freedom of movement. In this way, a transverse torque or a transverse load (i.e., a force which acts in a direction transverse to the thread longitudinal axis of the internal thread of the screw nut part 6) transmitted via the element to be moved onto the notch 8 in the bearing part 7 of the spindle nut 5 can be absorbed in that a compensation movement is induced relatively between the bearing part 7 and the screw nut part 6. A corresponding transverse load or a transverse torque is thus prevented from resulting in wedging and jamming of the participating threads, namely the internal thread of the screw nut part 6 and the external thread of the threaded spindle 4, which would induce a clamping force which would additionally have to be overcome by the drive motor 3, which would thus result in a higher power consumption of the drive motor and a lower efficiency, and which would at the same time cause wear of internal thread in the screw nut part 6 and external thread in the threaded spindle 4.

At the same time, the projections 12 prevent a relative movement between the bearing part 7 and the screw nut part 6 in a direction parallel to the thread longitudinal axis of the internal thread in the screw nut part 6 (and thus in the direction of the longitudinal extension of the threaded spindle 4), or restrict such a movement possibility to a minimum tolerable amount. It is thus ensured that the spindle drive 1 can move an element to be moved linearly without, or in any case without relevant longitudinal play, i.e., directly controlled.

It can furthermore be recognized in FIGS. 6 and 7 that the spindle nut 5 has a twist lock, using which twisting of the screw nut part 6 relative to the bearing part 7 around the thread longitudinal axis of the internal thread of the screw nut part 6 is prevented. This twist lock is formed here by lateral projections 14 formed on the screw nut part 6, which extend in their length along a subsection of the screw nut part 6 along a circumferential direction of the outer surface of the screw nut part 6, which is otherwise in the form of a cylindrical jacket in this section, and extend in a width in the longitudinal direction of the screw nut part 6, i.e., in parallel to the thread longitudinal axis of the internal thread. These projections 14 are seated approximately in the middle of the longitudinal extension of the screw nut part 6 in this exemplary embodiment. The projections 14 are formed having a convexly curved contour along their width in any case. This can in particular be in the shape of a cylindrical section. However, the projections 14 can also have a curvature—then also convex—in their longitudinal direction. They can thus also be formed in particular in the shape of spherical sections. It is essential that the projections 14 each form stop faces 15 on longitudinal ends of their longitudinal extension opposite to one another.

The projections 14 are received in the assembled state of the spindle nut 5 in depressions 16, which are formed in the bearing part 7. These depressions 16 have an essentially rectangular cross section here and also extend with a longitudinal extension in the circumferential direction of the receptacle 10. The depressions 16 also have stop faces (not shown in greater detail here) on their ends viewed in the direction of the longitudinal extension which, when the screw nut part 6 is inserted into the bearing part 7, interact with the stop faces 15 in order to prevent a pivot of the screw nut part 6 in relation to the bearing part 7, preferably essentially without play. As may be recognized from FIG. 7, the depressions 16 are designed wider in the width extension, however, than the projections 14. In this way and due to the shape of the projections 14 convexly curved in this direction, a yielding movement of the screw nut part 6 in relation to the bearing part 7 can still take place without the screw nut part 6 also rotating with the threaded spindle 4, i.e., a relative rotation of the screw nut part 6 in relation to the bearing part 7 occurring. This is prevented by the corresponding stop faces.

It is thus ensured here by the special design of the spindle nut 5 that the spindle drive 1 does not lose the smooth running of the spindle nut 5 on the threaded spindle 4 even if corresponding transverse forces or transverse loads act on the spindle nut 5 (whether due to certain tolerance-related manufacturing deviations or whether due to particularly high effective loads) and the power of the drive motor 3 can be utilized optimally for the adjustment movement. At the same time, it is ensured that the screw nut part 6 cannot pivot in the bearing part 7 around the thread longitudinal axis of its internal thread in relation to the bearing part.

LIST OF REFERENCE NUMERALS 1 spindle drive
2 drive housing
3 drive motor
4 threaded spindle
5 spindle nut
6 screw nut part
7 bearing part
8 notch
9 slot
10 receptacle
11 guide face
12 projection
13 end face
14 projection
15 stop face
16 depression

The invention claimed is:

1. A spindle drive, in particular for motor-driven movement of louvre elements of louvre windows or louvre shutters, said spindle drive comprising:
   a threaded spindle drivable to rotate by a drive motor;
   a spindle nut engaged with the threaded spindle and displaceable axially along the threaded spindle by rotation of the threaded spindle, wherein the spindle nut is constructed in multiple parts including a screw nut part having an internal thread to engage on an external thread of the threaded spindle, and a bearing part in which the screw nut part is mounted and which includes a driver structure for transmitting a drive force applied by the threaded spindle to the spindle nut to an element to be driven, wherein the screw nut part is mounted in the bearing part in such a way that the screw nut part executes a relative movement in relation to the bearing part having a directional component of the movement transverse to a thread longitudinal axis of the internal thread;
   a common drive housing, in which the drive motor, the threaded spindle, and the spindle nut are arranged, wherein the drive housing has a shape elongated in a longitudinal direction, and wherein the threaded spindle is arranged extending in the longitudinal direction of the drive housing; and
   guide structures are formed in the drive housing which interact with corresponding counter structures on the bearing part of the spindle nut in order to guide the spindle nut in the longitudinal direction of the drive housing.

2. The spindle drive as claimed in claim 1, wherein the screw nut part has:
   a bearing surface formed on an outer side of the screw nut part, wherein the bearing surface is formed in a shape of a spherical or cylindrical section in at least one section;
   wherein the screw nut part is mounted in a receptacle formed in the bearing part, wherein the receptacle has a receptacle surface which is formed in at least one section in the shape of spherical or cylindrical section corresponding to the section formed in the shape of a spherical or cylindrical section of the bearing surface; and wherein the respective sections formed in the shape of the spherical or cylindrical sections of the bearing surface and the receptacle surface form a joint.

3. The spindle drive as claimed in claim 2, wherein the section of the bearing surface formed in the shape of the spherical or cylindrical section is formed on at least one axial end face of the screw nut part viewed in a thread longitudinal direction in a region which is located axially beyond the internal thread, in front of or behind the internal thread, in the direction of the thread longitudinal axis.

4. The spindle drive as claimed in claim 1, further comprising axial stops for the screw nut part arranged in the bearing part.

5. The spindle drive as claimed in claim 1, further comprising a twist lock for preventing a relative twist of the screw nut part in relation to the bearing part around the thread longitudinal axis of the internal thread.

6. A spindle nut for a spindle drive as claimed in claim 1 constructed in multiple parts and having a screw nut part including an internal thread to engage on an external thread of the threaded spindle and a bearing part in which the screw nut part is mounted and which includes a driver structure for transmitting a drive force applied to the spindle nut to an element to be driven, wherein the screw nut part is mounted in the bearing part in such a way that the spindle nut executes a relative movement in relation to the bearing part having a directional component of the movement transverse to a thread longitudinal axis of the internal thread.

7. The spindle nut as claimed in claim 6, wherein the screw nut part has:
   a bearing surface formed on an outer side of the screw nut part, which is formed in the shape of a spherical or cylindrical section in at least one section;
   wherein the screw nut part is mounted in a receptacle formed in the bearing part, wherein the receptacle has a receptacle surface which is formed in at least one section in the shape of a spherical or cylindrical section corresponding to the section formed in the shape of the spherical or cylindrical section of the bearing surface; and
   wherein the respective sections formed in the shape of spherical or cylindrical sections of the bearing surface and the receptacle surface form a joint.

8. The spindle nut as claimed in claim 7, wherein the section of the bearing surface formed in the shape of the spherical or cylindrical section is formed on at least one axial end face of the screw nut part viewed in a thread longitudinal direction in a region which is located axially beyond the internal thread, in front of or behind the internal thread, in the direction of the thread longitudinal axis.

9. The spindle nut as claimed in claim 6, further comprising axial stops for the screw nut part arranged in the bearing part.

10. The spindle nut as claimed in claim 6, further comprising a twist lock for preventing a relative twist of the screw nut part in relation to the bearing part around the thread longitudinal axis of the internal thread.

11. The spindle nut as claimed in claim 6, wherein the multiple parts comprises two parts.

12. The spindle drive as claimed in claim 1, wherein the spindle nut is constructed in two parts.

13. The spindle drive as claimed in claim 1, wherein the guide structures are guide faces.

14. A louvre window or louvre shutter comprising:
   louvre elements arranged in a common frame pivotably around parallel rotational axes;
   a drive gearing including a thrust element connected to the louvre elements to convert a longitudinal movement into rotational movements of the louvre elements around the rotational axes; and
   a spindle drive coupled to the thrust element to drive the thrust element; wherein the spindle drive comprises:
      a threaded spindle drivable to rotate by a drive motor; and
      a spindle nut engaged with the threaded spindle and displaceable axially along the threaded spindle by rotation of the threaded spindle, wherein the spindle nut is constructed in multiple parts including a screw nut part having an internal thread to engage on an external thread of the threaded spindle, and a bearing part in which the screw nut part is mounted and which includes a driver structure for transmitting a drive force applied by the threaded spindle to the spindle nut to an element to be driven, wherein the screw nut part is mounted in the bearing part in such a way that the screw nut part executes a relative movement in relation to the bearing part having a directional component of the movement transverse to a thread longitudinal axis of the internal thread.

* * * * *